United States Patent
Northrop et al.

(10) Patent No.: US 6,196,157 B1
(45) Date of Patent: Mar. 6, 2001

(54) NESTABLE PET BED

(75) Inventors: Melaney Northrop, Cleburne; Jesus Benavides, Arlington, both of TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 09/291,770

(22) Filed: Apr. 14, 1999

(51) Int. Cl.⁷ ................................................. A01K 1/035
(52) U.S. Cl. .................................................. 119/28.5
(58) Field of Search ................................. 119/28.5, 526

(56) References Cited

U.S. PATENT DOCUMENTS

| | | | |
|---|---|---|---|
| 3,552,356 | * 1/1971 | Rosenthal | 119/28.5 |
| 5,010,843 | * 4/1991 | Henry | 119/28.5 |
| 5,136,981 | * 8/1992 | Barreto, III et al. | 119/28.5 |
| 5,265,558 | * 11/1993 | Schonrock | 119/28.5 |
| 5,311,837 | * 5/1994 | Mamer-Boellstorff | 119/28.5 |
| 5,363,804 | 11/1994 | McAlister | 119/28.5 |
| 5,515,811 | 5/1996 | McAlister | 119/28.5 |
| 5,588,393 | * 12/1996 | Heilgorn | 119/28.5 |
| 5,724,911 | * 3/1998 | McAlister | 119/28.5 |

* cited by examiner

*Primary Examiner*—Peter M. Poon
*Assistant Examiner*—Elizabeth Shaw
(74) *Attorney, Agent, or Firm*—Kristin Jordan Harkins

(57) ABSTRACT

The present invention relates to apparatus and methods for providing nestable pet beds which combine a flexible base and sidewall in a design which is readily stackable for compact transport, storage and display. The base and sidewall are cut from foam or other flexible material utilizing straight cuts which can be mass produced. The sidewall is cut along an arc as a unitary piece or as multiple pieces which collectively define an arcuate configuration. Providing an arcuate wall and attaching it in a flat wall to edge relationship with the base achieves a pet bed design with flared walls that can be nested. The relationship between the sidewall and the base causes radial forces to be exerted on the base, creating a concavity and convexity in the base when viewed from its lower and upper surface, respectively. The concavo-convex configuration imparts an aesthetically appealing, fluffy and comfortable appearance to the pet bed.

7 Claims, 3 Drawing Sheets

NESTABLE PET BED

FIELD OF THE INVENTION

The present invention relates generally to apparatus and methods for providing pet beds, and more particularly, to a partially enclosed pet bed which combines a flexible base and sidewall in a design which is readily stackable for compact transport, storage and display.

BACKGROUND OF THE INVENTION

Pet owners desire a secure, safe and comfortable environment for their cherished pets. Oftentimes, owners will purchase pet beds in an attempt to provide a cozy and snug shelter in which their pets can rest and relax. While various structures are available, pet beds which provide soft and flexible enclosures are desirable. Preferably, a comfortable base surrounded around its perimeter by a sidewall creates a cradle-like structure between the sidewall and the base. This enclosure provides a secure and snug feeling to the pet which can lean against the sidewall while resting on the base. These types of pet beds are constructed from various materials, including suitable flexible material such as soft or cushioned foam. While a thicker foam material may result in a softer, more comfortable bed, typically it will create a bulkier configuration.

Nestability of bulky pet beds is a desirable feature to manufacturers and retailers in the industry. Retail shelving space is a premium and the ability to display multiple pet beds which are fully assembled is desirable. Typically, a lack of shelving space dictates that a sole "floor model" be displayed, while the pet beds which are actually for sale are stored in the back of the retail store away from the view of the customer. However, nested beds can be stacked neatly and compactly on retail shelving in their fully assembled configuration without distracting from the overall appearance of the bed. Further, nestable beds are less cumbersome to transport. The nestability feature creates a densely packed shipping container without the need to deform, fold or compress the beds. This is particularly desirable as the flexible material or foam may tend to retain an inflicted deformity rather than returning to its original shape.

A variety of pet beds are available. For example, U.S. Pat. No. 5,515,811 to McAlister discloses a cushion comprised of a pad made of a number of layers of fibers. While this structure seeks to provide a soft and comfortable resting place for a pet, it does not provide upwardly extending sidewalls which create a cradle-like structure for pets to snuggle against while resting on the cushion.

Other beds are available that feature a cradle-like structure. U.S. Pat. No. 5,136,981 to Barreto, III et al. discloses a pet bed having an upwardly extending sidewall which encloses a base around its perimeter. A removable cover which is washable separately encases the sidewall and the base. While the disclosed structure provides a preferred cradle-like enclosure for a pet, its substantially vertical sidewall prevents nesting of fully assembled beds.

SUMMARY OF THE INVENTION

In accordance with the present invention, there is provided a novel apparatus and method for providing a pet bed design which is easy to manufacture, provides a comfortable and secure enclosure for a pet and, in addition, can be compactly transported, stored and displayed in a fully assembled configuration.

The pet bed generally comprises a base and an arcuate sidewall which are constructed of foam matting or other suitable flexible material. The base serves as a bed or cushion on which a pet rests or naps. The arcuate sidewall is affixed at a lower edge around the perimeter of the base to form a cradle-like structure. The pet can snuggle or lean against the sidewall while resting on the base. The arcuate configuration of the sidewall causes the sidewall to flare outward when affixed to the base.

The base is comprised generally of upper and lower surfaces and a side surface which generally defines the perimeter of the base. The configuration for the base can be substantially oval, circular, rectangular, square or any other desirable geometric configuration.

The arcuate sidewall can be cut as a unitary piece or, alternatively, can be constructed of multiple pieces which collectively define an arc. The sidewall is comprised generally of a lower edge having a minor peripheral dimension, an upper edge having a major peripheral dimension, an interior wall, and an exterior wall. The curvature of the arcuate sidewall generally defines the relationship between the major and minor peripheral dimensions. A larger curvature defines a major peripheral dimension which is relatively greater than minor peripheral dimension, while a smaller curvature defines a major peripheral dimension which is closer in length to the minor peripheral dimension. The minor peripheral dimension of the lower edge of the sidewall can be substantially the same as the perimeter of the base. Preferably, the minor peripheral dimension of the sidewall is less than the base perimeter so that the sidewall is stretched to wrap around the base.

The arcuate sidewall is wrapped around the base by affixing the lower edge of the sidewall interior wall around the side surface of the base. The resulting relationship between the interior sidewall and base side surface creates a pet bed having a sidewall which flares outwardly and upwardly from the upper surface of the base. The outward flare is dependent on the curvature of the arcuate sidewall. A sidewall having a larger curvature achieves a greater flare than a sidewall having a smaller curvature. Further, the lower edge of the sidewall at its exterior surface and the lower surface of the base define the bottom of the pet bed having a perimeter dimension.

The curvature of the sidewall and the tension created by stretching the sidewall around the side surface of the base causes radial forces to be exerted on the base. The radial forces create a concavity and a convexity in the base when viewed from its lower and upper surfaces, respectively. This concavo-convex configuration gives the upper surface of the base an aesthetically appealing, fluffy and comfortable appearance.

The concavo convex configuration of the base can be modified by varying the radial forces exerted on the base. As previously indicated, the radial forces are a function of the curvature of the sidewall and the relationship of the minor peripheral dimension of the sidewall to the base perimeter. Additionally, variable radial forces on the base can be accomplished during the cutting process of the base and sidewall from suitable flexible material. Preferably, the material is cut vertically to form a base having a side surface which is oriented in a substantially ninety degree relationship with the upper and lower surfaces of the base. This angled relationship of the base surfaces contributes to the radial forces exerted on the base when the sidewall is affixed around the base, and enhances the concavo-convex configuration of the base.

Similarly, vertical cuts could be used to form a sidewall having a substantially ninety degree relationship between the upper and lower edges and the interior and exterior walls. The substantially ninety degree orientation between the sidewall edges and walls and the base surfaces is an inexpensive and economical design, as the verticle cuts can be mass produced.

Alternatively, the radial forces on the base could be increased, and the concavo-convex configuration enhanced, by cutting the base side surface at an angle greater than ninety degrees from the lower surface of the base. Conversely, a decrease in the angle between the base side and lower surfaces could result in a reduction of radial forces exerted on the base and concavo-convex appearance.

The flared sidewall affixed to the base achieves a pet bed design that is readily stackable for compact transport, storage and display. Nestability is accomplished when the major peripheral dimension of the upper edge of the sidewall is larger than the perimeter of the bottom of the pet bed so that a first pet bed can fit neatly inside a second bed. This nestability can be repeated to stack multiple beds. Preferably, the bottom of the first pet bed would rest upon the upper surface of the base of the second bed in which is it nested. Accordingly, the greater the outward flare of the sidewall, the more efficient the nesting arrangement is, measured in terms of minimizing the overall height of a stack of beds.

The outward flare of the pet bad sidewall has a further advantage in that a smaller size base can be used to accommodate a larger pet. As a result, material costs are kept to a minimum while providing a comfortable and snug resting place for a pet.

A portion of the sidewall may be lower in height as measured from the base thereby defining an egress and ingress into the pet bed. Further, a notch can be formed along the upper edge of the sidewall to relieve any stress attributed by the curvature of the sidewall.

BRIEF DESCRIPTION OF THE DRAWINGS

The invention will be better understood and its numerous advantages will become apparent to those skilled in the art by reference to the following drawings in which.

DETAILED DESCRIPTION OF THE INVENTION

Figure 1:
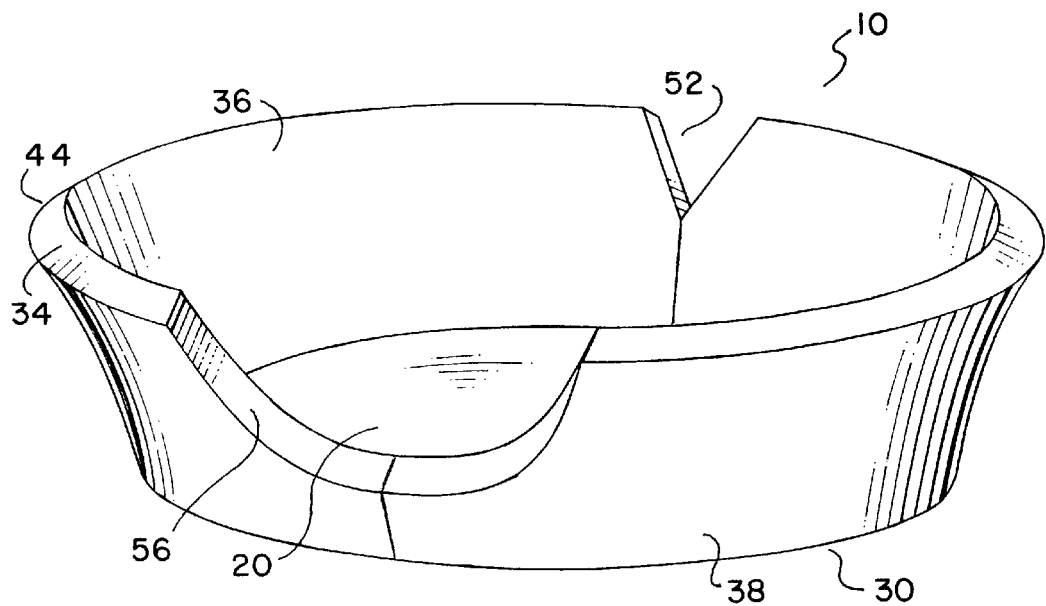
FIG. 1 is a perspective view of a pet bed constructed in accordance with the teachings of the present invention.

Referring now to FIG. 1, a pet bed 10 constructed in accordance with the teachings of the present invention will now be described in greater detail. The pet bed 10 is generally comprised of a base 20 and a sidewall 30 constructed of foam or other suitable flexible material. Base 20 serves as a bed or cushion on which a pet rests or naps. Sidewall 30 is affixed to base 20 around its perimeter to form a sidewall enclosure against which the pet can lean, and which provides a comfortable, secure and snug space for the pet.

Base 20 and sidewall 30 can be made of a soft, flexible foam-core material such as foam rubber or the like which is commonly used in the manufacture of mattress and cushions. Additionally, materials which are suitable for the present invention include those of the type disclosed, for example, in U.S. Pat. No. 5,136,981 to Barreto, III et al. As discussed in Barreto, III et al, a soft, flexible foam-core material, such as an open-cell or closed cell foam rubber, or similar material can be used in the construction of base 20 and sidewall 30. Alternatively, base 20 and sidewall 30 may be made with a hollow structure made of polyethylene, polypropylene, or similar material. Such a hollow structure could be formed by several different processes, including blow molding, rotational molding, vacuum molding, or injection molding. Since such a structure is hollow, base 20 and sidewall 30 are flexible. Further, this structure provides insulating, weight-supporting, and shock absorbent characteristics.

The thickness of base 20 and sidewall 30 is dependent on the desired softness and flexibility of the pet bed 10, as well as the size and weight of the pet. Base 20 and sidewall 30 may have substantially the same thickness by cutting them from the same or similar pieces of flexible material. Alternatively, the thicknesses may vary. It may be desirable to provide base 20 having a thickness greater than that of sidewall 30 to provide a comfortable cushion, while minimizing the bulkiness of sidewall 30. While a range of thicknesses is suitable, preferably the thickness for base 20 and sidewall 30 is approximately one and one half inches.

Figure 2:
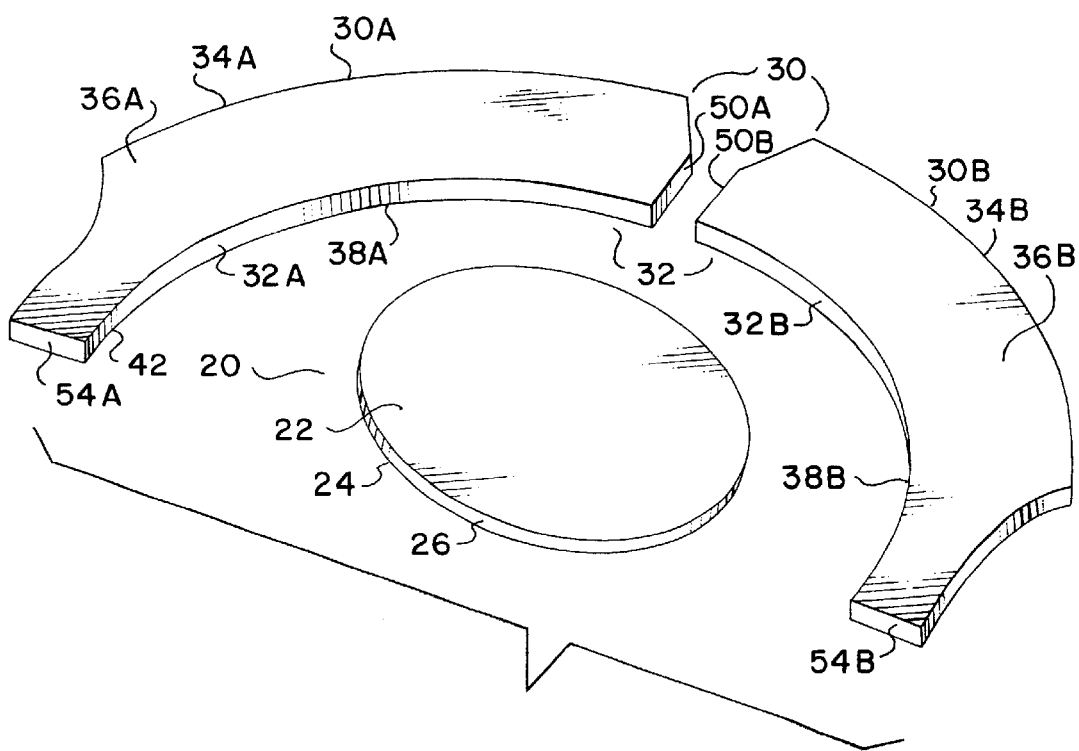
FIG. 2 is a perspective view of the elements of an embodiment of a pet bed of the present invention.
Figure 3:
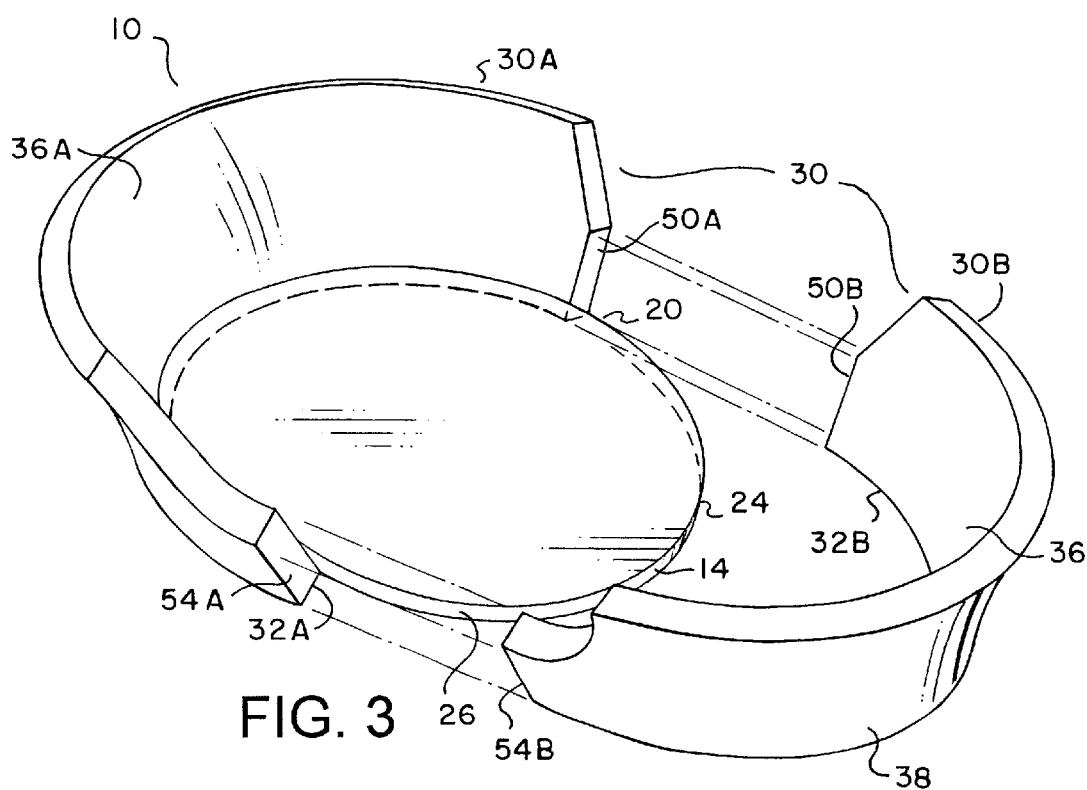
FIG. 3 is an exploded perspective view of a pet bed of the present invention.

Referring now to FIGS. 2 and 3, base 20 is comprised of an upper surface 22, a lower surface 24 and a side surface 26 which generally defines the perimeter of base 20. While the shape of base 20 is illustrated in the figures as oval, the present invention is not limited to this configuration. Other suitable shapes include circles, rectangles, squares, or other desirable geometric configurations.

Sidewall 30 is a generally arcuate configuration which can be a unitary piece or can be constructed of multiple pieces, for example two or more sidewall portions 30A, 30B which collectively define an arc. While the following discussion is directed to a two piece construction of sidewall 30, it is to be understand that the same general concept applies to a one piece or other multiple piece configurations of sidewall 30 suitable for manufacturing pet bed 10 of the present invention. Each of sidewall portions 30A, 30B is comprised generally of a lower edge 32A, 32B, an upper edge 34A, 34B, an interior wall 36A, 36B and an exterior wall 38A, 38B. Further, each of sidewall portions 30A, 30B comprises back side 50A, 50B and front side 54A, 54B. Back sides 50A and 50B of sidewall portions 30A, 30B are joined to form unitary sidewall 30 having a unitary lower edge 32, a unitary upper edge 34, a unitary interior wall 36 and a unitary exterior wall 38. Lower edge 32 of sidewall 30 defines a minor peripheral dimension 42 and upper edge 34 defines a major peripheral dimension 44.

The curvature of arcuate sidewall 30 generally defines the relationship of minor and major peripheral dimensions 42, 44 of lower and upper edges 32, 34, respectively. A larger curvature defines major peripheral dimension 44 which is relatively greater than minor peripheral dimension 42 of sidewall 30. Conversely, a smaller curvature defines a major peripheral dimension 44 which is closer in length to minor peripheral dimension 42. Further, sidewall 30 having substantially no curvature defines major and minor peripheral dimensions 44, 42 which are relatively the same.

To wrap sidewall 30 around base 20, minor peripheral dimension 42 of sidewall 30 can be substantially the same as the perimeter of base 20 defined by its side surface 26. Alternatively, minor peripheral dimension 42 of sidewall 30 is less than the perimeter of base 20, so that sidewall 30 is stretched to wrap around base 20. It is to be understood that the other relationships between minor peripheral dimension 42 of sidewall 30 and the perimeter of base 20 are suitable, so long as sidewall 30 can be wrapped around base 20.

Referring now to FIG. 3, pet bed 10 is constructed by wrapping sidewall 30 around base 20. Interior walls 36A, 36B of sidewall portions 30A, 30B are affixed proximate their lower edges 32A, 32B to side surface 26 of base 20. Suitable materials for affixing sidewall portions 30A, 30B to base 20 include, but are not limited to, glue, epoxy, paste, gum, cement, sealant, or other bonding agents. Back sides 50A, 50B of sidewall portions 30A, 30B are joined. Similarly, front sides 54A, 54B are joined. It is to be understood that the foregoing order of steps is not important. For example, back sides 50A, 50B can be joined before or after sidewall portions 30A, 30B are affixed to base 20. Similarly, front sides 54A, 54B can be joined before or after sidewall portions 30A, 30B are affixed to base 20, or before or after back sides 50A, 50B are joined. Further, lower edge 32 of sidewall 30 at its exterior wall 38 and lower surface 24 of base 20 generally define bottom 12 of pet bed 10 (See FIG. 5) having a perimeter dimension 14.

Figure 4:
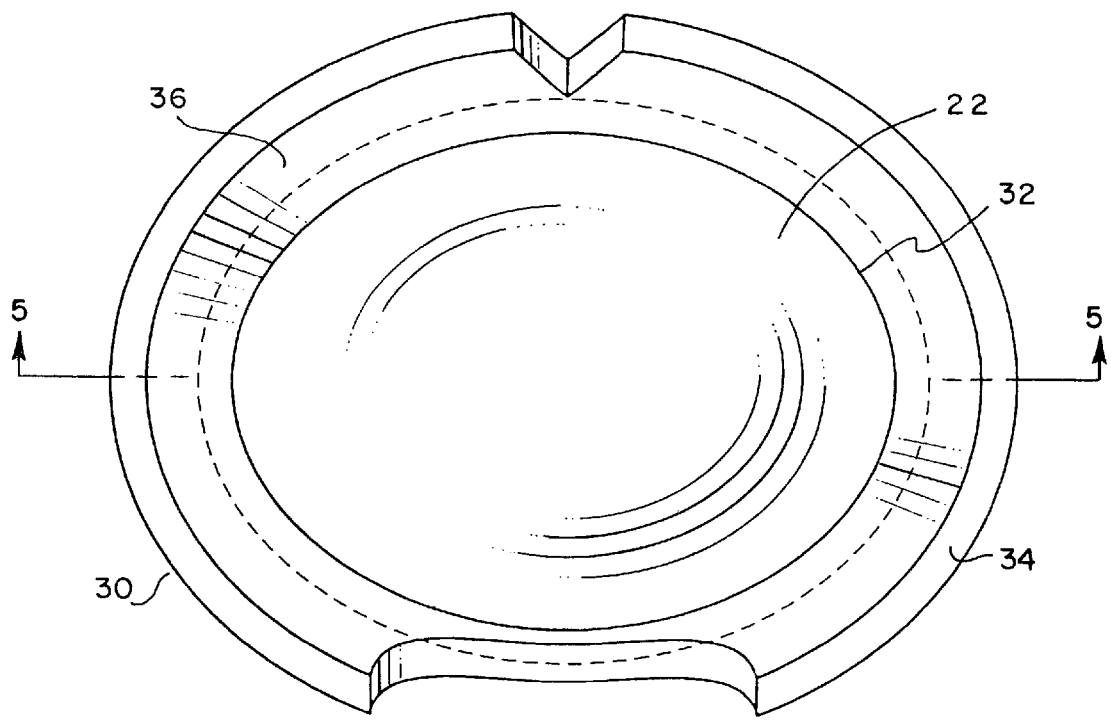
FIG. 4 is a top plan view of a pet bed of the present invention.
Figure 5:
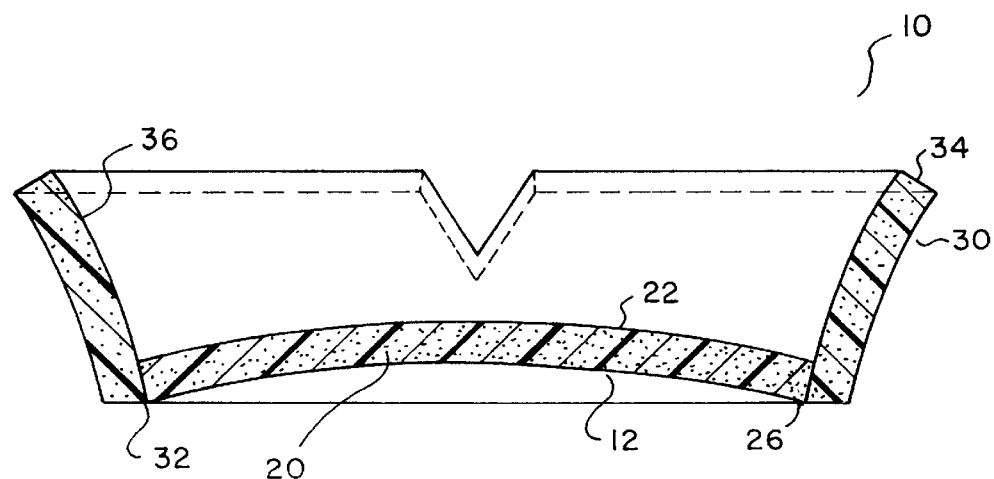
FIG. 5 is a cross-sectional view taken along lines 5—5 of FIG. 4 of a pet bed of the present invention.

Referring now to FIGS. 4 and 5, lower edge 32 of sidewall interior wall 36 which is affixed to side surface 26 of base 20 creates a pet bed 10 having sidewall 30 which flares outwardly and upwardly from upper surface 22 of base 20. The curvature of sidewall 30 generally defines its outward flare when affixed to base 20. Sidewall 30 having a larger curvature achieves a greater flare than sidewall 30 having a smaller curvature.

Stretching sidewall 30 around base 20 exerts radial forces on base 20. The radial forces are amplified by the arcuate configuration of sidewall 30 which urges upper edge 34 outwardly when sidewall 30 is affixed to base 20. The radial forces on base 20 create a concavity in base 20 when viewed from its lower surface 24, and a convexity when viewed from the base upper surface 22. The concavo-convex configuration gives upper surface 22 of base 20 an aesthetically appealing, fluffy and comfortable appearance.

Returning to FIGS. 2 and 5, the concavo-convex configuration of base 20 is dependent on additional novel features of the present invention. Radial forces on base 20 can also be created by the cutting technique of base 20 and sidewall 30 from flexible material, as well as the thickness of the material, its density and flexibility. Preferably, the flexible material is cut vertically to form base 20 having side surface 26 oriented in a substantially ninety degree relationship with upper and lower base surfaces 22, 24. This angled relationship of base surfaces 22, 24, 26 contributes to the exertion of radial forces on base 20 when sidewall 30 is affixed around base 20, and advances the novel feature of the concavo-convex appearance.

Similarly, verticle cuts can be used to form sidewall 30, wherein lower edge 32 and upper edge 34 are oriented in a substantially ninety degree angle with interior and exterior walls 36, 38. The ninety degree orientation between sidewall edges 32,34 and walls 36,38, and between base surfaces 22,24,26 is a relatively inexpensive and economical design, as the verticle cuts from a suitable material can be mass produced. However, it is to be understood that other angles between the surfaces of base 20 and the edges and walls of sidewall 30 may be suitable.

For example, it may be desirable to enhance the concavo-convex appearance of base 20. Base side surface 26 can be cut at an angle greater than ninety degrees from lower surface 24 of base 20, thereby increasing the radial forces exerted on base 20 when sidewall 30 is affixed thereto. Conversely, a smaller angle between base side surface 26 and lower surface 24 would result in smaller radial forces on base 20 and likewise, a less enhanced concavo-convex appearance.

Figure 6:
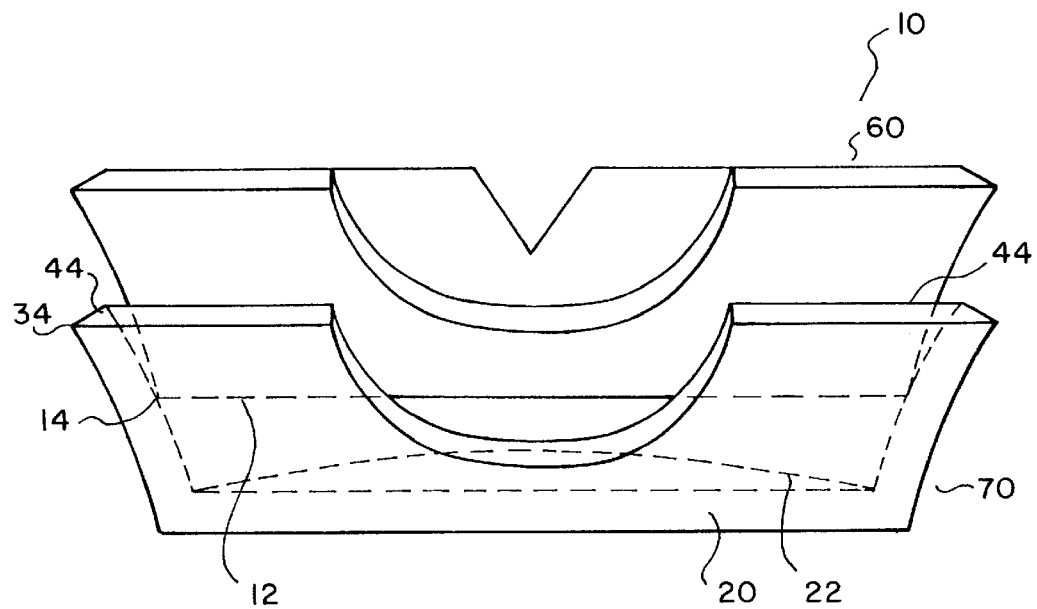
FIG. 6 is a front plan view of pet beds of the present invention shown in a nesting arrangement.

Referring to FIG. 6, the nestability feature of pet bed 10 will now be described in greater detail. Nestability is achieved when sidewall upper edge 34 has a larger major peripheral dimension 44 than the perimeter 14 of bottom 12 of the pet bed so that the bottom 12 of a first pet bed 60 fits inside a second pet bed 70. A nesting arrangement which keeps the overall height of a stack of pet beds to a minimum is desirable. The greater the outward flare of sidewall 30, the further a first pet bed 60 can fit inside a second pet bed 70, thereby minimizing the stack height. Preferably, bottom 12 of a first pet bed 60 rests upon upper surface 22 of base 10 of a second pet bed 70. Nestability is also generally dependent on the thickness of sidewall 30. A pet bed having a thicker sidewall would not nest as compactly as one with a thinner sidewall.

The nestability feature of the present invention allows pet beds 60,70 to be stacked neatly and compactly on retail shelving in their fully assembled configuration without distracting from the overall appearance of the bed. The nestability feature also allows pet beds 60,70 to be densely packed in shipping containers without the need to deform, fold or compress the beds. This is particularly desirable as the flexible material or foam may tend to retain an inflicted deformity rather than returning to its original shape.

Returning to the figures and specifically to FIGS. 1 and 2, a notch 52 can be formed in sidewall 30 proximate its backside 50 to relieve any stress in sidewall 30 caused by stretching lower edge 32 around base 20. Notch 52 also relieves sidewall 30 of any excess material at upper edge 34. In a multiple piece configuration for sidewall 30, notch 52 preferably is proximate backsides 50A, 50B of sidewall portions 30A, 30B, respectively. It is to be understood that any location proximate the upper edge of sidewall 30 is suitable.

An entry 56 can be formed in sidewall 30 by lowering the height of upper edge 34 proximate front side 54 of sidewall 30. Entry 56 defines an egress and ingress into pet bed 10. Preferably, entry 56 is opposite notch 52 of sidewall 30, although other configurations may be suitable. In a multiple piece configuration for sidewall 30, entry 56 is proximate front sides 54A, 54B of sidewall portions 30A, 30B, respectively.

Using the aforementioned concepts, a wide variety of differently configured pet beds can be manufactured. For example, the base and sidewalls may be configured to create a circular pet bed, a rectangular pet bed, or any other desirable configuration.

What is claimed is:

1. A nestable pet bed, comprising:

a base having a side surface and an upper surface, said side surface of said base defining a perimeter of said base;

a sidewall having a lower edge of a minor peripheral dimension which is less than said perimeter of said base; and said lower edge of said sidewall is stretched to substantially wrap around said side surface of said base to form a generally erect enclosure of said sidewall around said base, wherein a convexity is formed in said upper surface of said base.

2. A nestable pet bed, according to claim 1, wherein:

said sidewall further comprises two sidewall portions, each of said sidewall portions having a front, a back, and a lower edge, said lower edges of said sidewall portions collectively defining said minor peripheral dimension of said sidewall; and said lower edges of said sidewall portions substantially extend around said side surface of said base such that said fronts and said backs of said sidewall portions substantially converge, respectively, to form a generally erect enclosure of said sidewall portions around said base.

3. A nestable pet bed, according to claim 1, wherein said sidewall further comprises an upper edge having a major peripheral dimension which is greater than said minor peripheral dimension of said lower edge of said sidewall.

4. A nestable pet bed, according to claim 3, wherein a notch is formed in said sidewall proximate said upper edge to define a stress relief recess.

5. A nestable pet bed, according to claim 5, wherein an entry is formed in said sidewall substantially opposite said notch proximate said upper edge of said sidewall.

6. A nestable pet bed, according to claim 3, wherein an entry is formed in said sidewall substantially opposite said notch proximate said upper edge of said sidewall.

7. A nestable pet bed, according to claim 3, wherein;

said base further comprises a lower surface;

said lower edge of said sidewall and said lower surface of said base collectively define a bottom of the pet bed having a perimeter; and wherein said major peripheral dimension of said upper edge of said sidewall is greater than said perimeter of said pet bed bottom such that the bottom of a first pet bed can fit inside a second pet bed for nestability.

* * * * *